United States Patent [19]

Shekleton et al.

[11] Patent Number: 4,974,415
[45] Date of Patent: Dec. 4, 1990

[54] STAGED, COAXIAL MULTIPLE POINT FUEL INJECTION IN A HOT GAS GENERATOR

[75] Inventors: Jack R. Shekleton, San Diego; Roy W. Vershure, Escondido; William Brower, San Diego, all of Calif.

[73] Assignee: Sundstrand Corporation, Rockford, Ill.

[21] Appl. No.: 272,409

[22] Filed: Nov. 17, 1988

Related U.S. Application Data

[63] Continuation-in-part of Ser. No. 123,303, Nov. 20, 1987, Pat. No. 4,899,538.

[51] Int. Cl.⁵ .................................................. F23R 3/34
[52] U.S. Cl. ..................................... 60/733; 60/748; 60/760
[58] Field of Search ................ 60/732, 733, 737, 748, 60/759, 760, 753, 39.465; 431/182, 183, 185, 187, 158, 242, 243

[56] References Cited

U.S. PATENT DOCUMENTS

| | | |
|---|---|---|
| 1,828,784 | 10/1931 | Perrin . |
| 2,850,875 | 9/1958 | Gahwyler ............................. 60/748 |
| 2,999,359 | 9/1961 | Murray ................................. 60/733 |
| 3,982,392 | 9/1976 | Crow .................................... 60/753 |
| 4,260,367 | 4/1981 | Markowski et al. ................. 60/742 |
| 4,265,615 | 5/1981 | Lohmann et al. .................... 60/748 |
| 4,441,324 | 4/1984 | Abe et al. ............................. 60/753 |
| 4,474,014 | 10/1984 | Markowski . |
| 4,655,044 | 4/1987 | Dierberger et al. ................. 60/753 |

FOREIGN PATENT DOCUMENTS

| | | | |
|---|---|---|---|
| 3606625 | 9/1986 | Fed. Rep. of Germany ........ 60/737 |
| 359323 | 9/1962 | Switzerland ......................... 60/748 |

Primary Examiner—Louis J. Casaregola
Assistant Examiner—Timothy S. Thorpe

[57] ABSTRACT

Improved performance in a hot gas generator is achieved by disposing a dual fuel injector 42 having spaced fuel discharge ports 48, 60 on the longitudinal axis 28 of a vessel 18 having a narrow inlet 22, an opposite narrow outlet 14 and an intermediate, enlarged chamber 24 which serves as a combustion chamber.

3 Claims, 1 Drawing Sheet

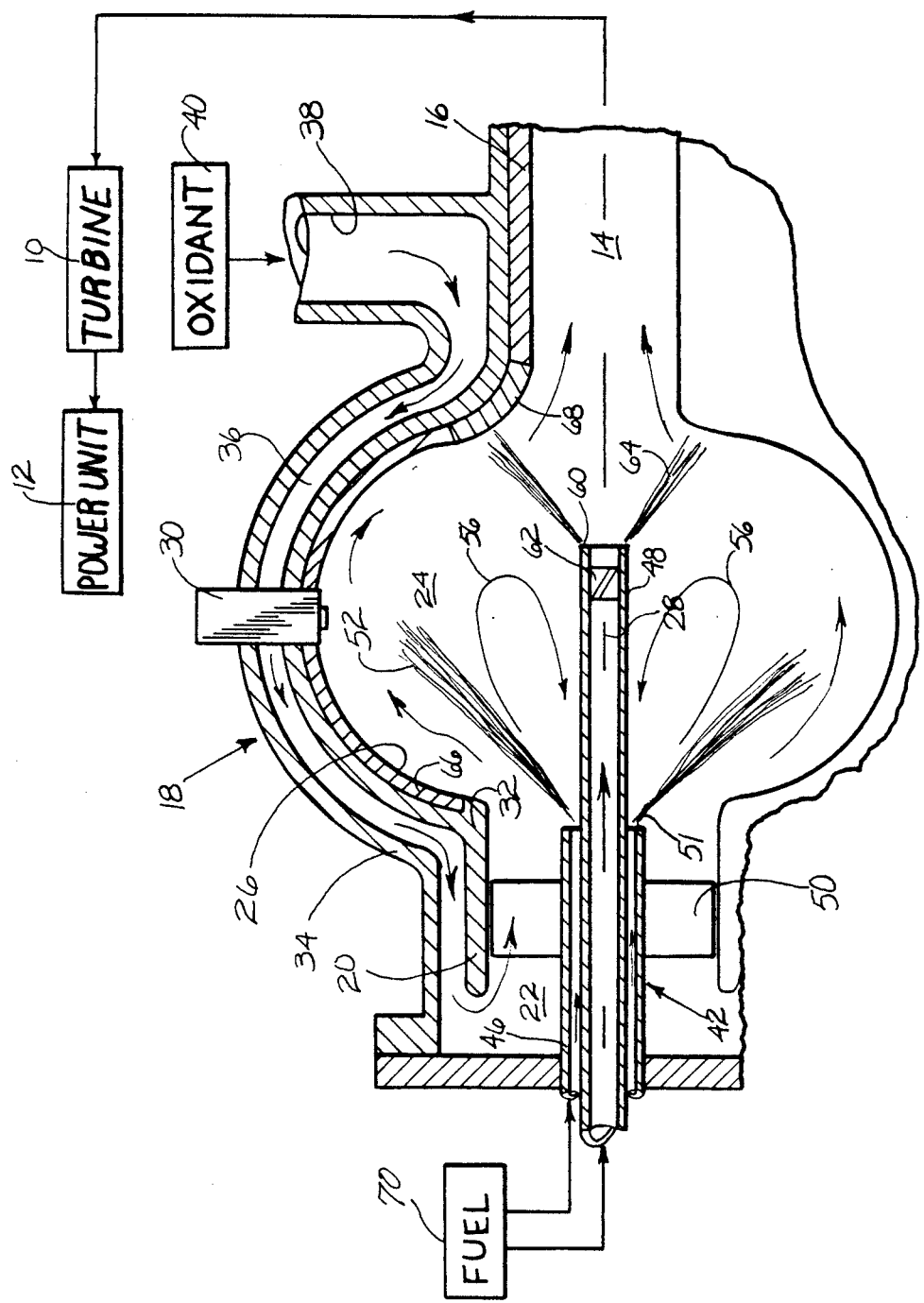

STAGED, COAXIAL MULTIPLE POINT FUEL INJECTION IN A HOT GAS GENERATOR

CROSS REFERENCE

This application is a continuation-in-part of the commonly assigned, copending application of Jack R. Shekleton, one of the inventors herein named, application Ser. No. 123,303, filed Nov. 20, 1987, now U.S. Pat. No. 4,899,538 the details of which are herein incorporated by reference.

FIELD OF THE INVENTION

This invention relates to a generator for producing hot gasses as, for example, might be employed to drive a turbine wheel.

BACKGROUND OF THE INVENTION

Hot gas generators have long been utilized for producing hot gas under pressure to operate engines of various sorts as well as for other purposes. See, for example, U.S. Pat. No. 1,828,784 issued Oct. 27, 1931 to Perrin which constitutes the most pertinent prior art known to the applicant.

In such hot gas generators, a carbonaceous fuel is combusted with an oxidant to produce hot gasses of combustion. In addition, additional fuel may be introduced into the hot gasses of combustion to be vaporized, or partly decomposed, or both, dependent on gas temperature as opposed to combusted, to increase the volume of hot gas while bringing the temperature of the combustion gas down to some desired temperature incapable of causing damage to the system in which the generator is used.

One difficulty in the operation and use of such hot gas generators is carbon buildup. Carbon buildup results when the fuel is not completely oxidized and elemental carbon is formed within the combustion chamber of the generator. It may deposit itself at various locations therein, particularly those running at relatively cool temperatures. While carbon buildup can be avoided by providing the generator with an excess of oxidant. As ordinarily there is a plentiful supply of liquid fuel, then in consequence, it is conventional practice to run a hot gas generator on the rich side so that all oxidant available for combustion is consumed to minimize the consumption of oxidant; and this raises the potential for carbon buildup.

As pointed out by Perrin in his previously identified United States Letters Patent, it is also desirable to cool the combustion chamber to prevent damage thereto by excessive heat from combustion occurring therein. Advantageously, this is accomplished by cooling the combustion chamber with fuel. However, in the Perrin construction, there is the opportunity for excessive cooling of the combustion chamber walls; and the resulting cool spots facilitate carbon buildup when the generator is operated on the rich side as is desired to prevent the existence of hot spots.

Carbon buildup is undesirable because it may interfere with heat transfer. However, another problem resulting from carbon buildup is much more serious. Specifically, such hot gas generators are frequently used to produce hot gasses for driving turbine wheels. As carbon builds up, particles of the same typically break free and then flow with the hot gas through the turbine wheel. Such particulate carbon erodes the turbine nozzles and the turbine wheels. Furthermore, carbon deposits can build up on the surfaces of the turbine nozzles and restrict the flow to cause performance losses.

The hot gas generator disclosed by Shekleton avoids many of these difficulties and is accordingly highly advantageous. Nonetheless, improvements in terms of simplifying the construction, assuring full and complete vaporization of fuel introduced downstream of the main combustion zone, and minimizing the number of obstructions in the gas flow zone are desirable.

The present invention is directed to providing the above improvements.

SUMMARY OF THE INVENTION

It is the principal object of the invention to provide a new and improved hot gas generator. More specifically, it is an object of the invention to provide a hot gas generator that is constructed with a simplified fuel injection nozzle structure. It is also an object of the invention to provide a hot gas generator with provision for enhanced vaporization of fuel injected into the hot gas generator downstream of the primary combustion zone.

An exemplary embodiment of the invention achieves the first of the above-named objects in a hot gas generator including a vessel with an interior wall having a narrow inlet and an opposite, narrow outlet end. An intermediate, relatively wide, combustion chamber connects the inlet and the outlet and an oxidant inlet port is disposed at the inlet end.

According to one facet of the invention, a dual fuel injector is disposed generally centrally within the oxidant port and extends a major way across the chamber generally centrally thereof. The fuel injector has first fuel discharge port at the inlet for directing fuel toward the combustion chamber and at least a second fuel discharge port near the outlet end for directing fuel toward the outlet end.

As a consequence, a unitary injection structure that may be readily serviced is defined and by reason of its central location within the chamber, the same does not impede gas flow.

In a highly preferred embodiment, this facet of the invention contemplates that the vessel have a longitudinal axis extending through the chamber between the ends and the injector is disposed substantially on the axis. The oxidant port is concentric with the axis and located about the fuel injector.

Preferably, the injector comprises first and second concentric conduits or tubes terminating in respective ones of the fuel discharge ports.

According to another aspect of the invention, there is provided a vessel having an oxidant inlet port as before. According to this facet of the invention, there is provided a first fuel injection port adjacent the inlet and a second fuel injection port within the chamber and upstream of the outlet end. Advantageously, the second fuel injection port is disposed to inject fuel onto the interior wall in the vicinity of the outlet end. As a consequence, the fuel tends to stick to the interior wall and move more slowly than the outrushing gas. The relative movement between the two insures a high degree of turbulence which in turn enhances heat transfer which ultimately and desirably increases the rate of vaporization. Specifically, it is most important to assure the fastest possible evaporation of the fuel. Otherwise the liquid fuel overheats and produces deleterious carbon build up and excessive exhaust smoke.

Other objects and advantages will become apparent from the following specification taken in connection with the accompanying drawing.

DESCRIPTION OF THE DRAWING

The FIG. is a partial schematic, partial sectional view of a hot gas generator made according to the invention along with certain components of a system with which the hot gas generator is adapted to be used.

DESCRIPTION OF THE PREFERRED EMBODIMENT

An exemplary embodiment of a hot gas generator made according to the invention is illustrated in the FIG. in the environment of a turbine system including a turbine 10 for driving a power unit 12 such as a typical "emergency power unit" which may be in the form of an electrical generator, a hydraulic pump, a combination thereof, etc. The turbine 10 is driven with hot gas from an outlet 14 located at one end 16 of a vessel, generally designated 18. The opposite end 20 of the vessel 18 has an inlet 22 which is spaced from the outlet 14 by an intermediate, enlarged, combustion chamber 24. That is to say, the enlarged, intermediate combustion chamber 24 interconnects a narrow inlet 22 and a narrow outlet 14. Stated another way, the vessel 18 includes an interior surface 26, which typically will be a surface of revolution about an axis 28, that first progressively widens and then progressively narrows as the outlet 14 is approached from the inlet 22. Preferably the inner surface 26 of the chamber 24 is spherical.

A high energy ignition device 30 may extend into the chamber 24.

Desirably, the vessel 18 includes an inner wall 32 having the inner surface 26 which defines the confines of the combustion chamber 24 and a spaced, outer shell or wall 34. In this regard, the igniter 30 may serve as one of several radial support elements (those other than the igniter 30 are not shown) which serve to locate the inner wall 32 with respect to the outer shell 34. Between the two is a duct 36 which extends from an oxidant inlet 38 connected to a supply of oxidant 40 and about the chamber 24 to the inlet 22. Thus, oxidant sustained combustion within the chamber 24 serves to cool the wall 32 as it flows from the oxidant inlet 38 to the inlet 22 to the combustion chamber 24. In a preferred embodiment, the oxidant entering the inlet 38 will already be in the gaseous phase for at low combustion rates, the relatively low flow rate of a liquid phase oxidant (for fuel used for cooling) would allow the same to boil within the duct 36. This in turn makes the flow rate difficult to control and causes other problems as well. If desired, turbulators such as trip strips (not shown) may be disposed on either or both interior surfaces of the duct 36 to enhance cooling.

The inlet 22, as will appreciated from the foregoing discussion, serves an an oxidant inlet to the combustion chamber 24. In addition, a dual fuel injector, generally designated 42, extends into the chamber 24 through the inlet 22. The fuel injector 42 is disposed on the axis 28 and its radially outer periphery is located radially inwardly of the periphery of the inlet 22 so that an oxidant inlet port is effectively defined by the annular space between the fuel injector 42 and the interior wall 26 at the inlet 22. The fuel injector 42 is comprised of two concentric tubes or conduits 46 and 48. The tube 46 is the outermost tube and has a shorter length within the vessel 18 than the length of the tube 48 which, in turn, is located within the tube 46. In addition, swirler blades or vanes 50 are mounted, as by brazing on the tube 46 so as to be located in the inlet 22 and impart a high degree of swirl to oxidant as it enters the chamber 24.

The outermost tube 46 terminates at an end 51 adjacent the inlet 22 to the chamber 24. By any suitable means known in the art, the end 48 is adapted to inject a cone-like spray 52 of fuel into the combustion chamber to combust with the oxidant. Much of the resulting hot gas will flow to the outlet 14 but a recirculating pattern illustrated by arrows 56 to provide stabilized combustion within the chamber 24 will occur.

The tube 48 extends a majority of the way through the chamber 24 to terminate in an end 60 adjacent the outlet 14. The end 60 is in the progressively narrowing part of the chamber 24 and within the tube 48 just upstream of the end may be an internal swirler 62. The swirler 62 imparts swirl to the fuel being injected into the vessel 18 near the outlet 14 through the end 16 except the same forms a conelike spray 64 of fuel which impinges against the inner wall 26 adjacent the outlet 14. The spray can be formed by many various means known in the art.

Generally, the interior surface 26 will be defined by a heat shield 66 extending about the chamber. In the vicinity whereat the spray 64 impinges on the wall 26, a heat shield insert 68 capable of withstanding the thermal shock that may be imparted thereto by being subjected to the hot gases approaching 4,000° F. while at the same time having much cooler fuel impinging upon it, may be located.

Finally, a source of fuel 70 is provided whereby fuel may be directed to the interior of the tubes 46 and 48 as desired.

The just described structure has a number of advantages. For one, the dual fuel injector 42 is a unitary structure, preferably, although not necessarily including the swirler vanes 50. The injector 42 may be easily removed for servicing and just as easily reinstalled. Moreover, because the tube 48 is located centrally of a toroidalshaped recirculation zone, it does not interfere with the outflow of hot gases through the outlet 14. At the same time, the relatively high fuel flow through the tube 48 assures that the same will not overheat. In fact, in some instances, it may be desirable to place a thermal barrier coating on the exterior of the tube 48 that will run at a relatively hot temperature to avoid any possibility of carbon buildup.

The spraying of the fuel in the cone 64 upon the interior wall 26 also provides advantages. In particular, if the spray were strictly into the outgoing flow of gas, the fuel droplets would be quickly accelerated up to the speed of the flowing gas. When that speed is attained, there is no relative movement between the gas and the fuel droplets with the consequence that there is little, if any, heat transfer. Less than full vaporization may occur which is undesirable for any of a variety of reasons.

However, by taking advantage of the feature of the invention whereby the fuel is sprayed in a spray 64 upon the interior wall 26, the fuel tends to stick to the wall and is dragged along the wall by the out-flowing gas. This, of course, prolongs the relative movement that occurs between the fuel droplets and the gas thereby maximizing heat transfer to assure full and complete vaporization.

This factor, coupled with a mode of operation such that the wall or inner surface 26 of the combustion chamber 24 is run relatively hot, inhibits carbon build up. In addition, and even more importantly, it is desirable to operate at an air/fuel mass ratio that is not less than about 12 to 1 inside the chamber 24. A high carbon to hydrogen fuel such as diesel fuel could have a somewhat higher air/fuel ratio whereas a low carbon to hydrogen fuel such as JP4 could have a somewhat lower air/fuel ratio in those cases where air is the oxidant.

Significantly, it is important to operate with a stoichiometric excess of fuel in the chamber 24 if oxidant use is to be minimized. This is particularly true where low turbine inlet gas temperatures are employed. Such relatively low turbine inlet gas temperatures are those below about 1650° F. Thus in the chamber 24, operating at an air-fuel ratio of say 12 and with gas temperatures on the order of 3800° F. or 50, all the oxygen will be consumed. If operating at an air-fuel ration of, say, 16 to 1, then all the oxygen will not be consumed. In such a case, downstream of the second fuel admission, with temperatures, say of 1650° F., the reaction will be frozen and the excess oxidant wasted. Air or oxidant assist might be used, in many of the various known ways, to atomize fuel in the first fuel injector end 48. However, such a method of fuel atomization is to be avoided in the second fuel injector end 60 as the low (1650°F.) temperatures will result in wasted oxidant.

We claim:

1. A hot gas generator comprising:
   a vessel with an interior wall and having a narrow inlet end, an opposite, narrow outlet end, and an intermediate, relatively wide, combustion chamber interconnecting said inlet end and said outlet end;
   an oxidant inlet port at said inlet end;
   a dual fuel injector disposed generally centrally within said oxidant port and extending a major way across said chamber generally centrally thereof, said fuel injector having a first upstream fuel discharge port at said inlet end for directing fuel toward said combustion chamber and a second downstream fuel discharge port near said outlet end for directing fuel toward said interior wall at said outlet end; and
   a source of fuel to which said second fuel discharge port is exclusively connected so that fuel discharged therefrom is free of oxidant.

2. The hot gas generator of claim 1 wherein said vessel has a longitudinal axis extending through said chamber between said ends and said injector is disposed substantially on said axis; said oxidant port being concentric with said axis.

3. The hot gas generator of claim 1 wherein said injector comprises first and second, concentric conduits terminating in respective ones of said fuel discharge ports.

* * * * *